(12) United States Patent
Thornhill et al.

(10) Patent No.: US 12,500,812 B2
(45) Date of Patent: Dec. 16, 2025

(54) HARDWARE AGNOSTIC SYSTEMS FOR CONVERTING SOURCE SIGNALS OF AGRICULTURAL EQUIPMENT TO STRUCTURED SIGNALS FOR COMMUNICATION OVER COMPUTER NETWORKS

(71) Applicant: The GSI Group LLC, Assumption, IL (US)

(72) Inventors: Paul Edward Thornhill, Champaign, IL (US); Vincent Thibault, Montreal (CA)

(73) Assignee: The GSI Group, LLC, Assumption, IL (US)

( * ) Notice: Subject to any disclaimer, the term of this patent is extended or adjusted under 35 U.S.C. 154(b) by 0 days.

(21) Appl. No.: 18/720,709

(22) PCT Filed: Nov. 28, 2022

(86) PCT No.: PCT/IB2022/061484
§ 371 (c)(1),
(2) Date: Jun. 17, 2024

(87) PCT Pub. No.: WO2023/139426
PCT Pub. Date: Jul. 27, 2023

(65) Prior Publication Data
US 2025/0055780 A1 Feb. 13, 2025

Related U.S. Application Data

(60) Provisional application No. 63/266,941, filed on Jan. 19, 2022.

(51) Int. Cl.
*H04L 41/0806* (2022.01)
*H04L 43/10* (2022.01)
*H04L 67/125* (2022.01)

(52) U.S. Cl.
CPC .......... *H04L 41/0806* (2013.01); *H04L 43/10* (2013.01); *H04L 67/125* (2013.01)

(58) Field of Classification Search
CPC ... H04L 43/10; H04L 41/0806; H04L 67/125; H04L 67/562; H04L 67/34; H04L 67/55;
(Continued)

(56) References Cited

U.S. PATENT DOCUMENTS

2022/0183087 A1* 6/2022 Ferrere ................ G06K 7/1417
2023/0200287 A1* 6/2023 Dasika ................. G01S 17/894
172/1

FOREIGN PATENT DOCUMENTS

CN 109150703 A * 1/2019 ............. H04L 12/66
CN 112511416 A 3/2021
(Continued)

OTHER PUBLICATIONS

European Patent Office, International Search Report related to International Patent Application No. PCT/IB2022/059043, mail date Feb. 8, 2023, 13 pages.
(Continued)

*Primary Examiner* — Oanh Duong
(74) *Attorney, Agent, or Firm* — RAY QUINNEY & NEBEKER; Daniel J. Bezdjian (57) ABSTRACT

Described herein are technologies to enable farming equipment to connect and communicate with a remote computing system. The technologies can be hardware agnostic in that the technologies do not require special hardware adaptations and can operate with different types of hardware and software systems to overcome compatibility issues of such systems in farming equipment. In some embodiments, a hardware agnostic adapter is configured to connect or integrate with farming equipment and communicate with a remote computing system. Also, the technologies can con-
(Continued)

vert source data (which, for example, describes hardware functions of equipment) into structured data and communicate the structured data to the remote system via a network configured to communicate the structured data but not necessarily configured to communicate the source data. The conversion can occur according to a provisioning configuration or a mapping configuration installed in or associated with the farming equipment.

20 Claims, 8 Drawing Sheets

(58) Field of Classification Search
CPC ........ H04L 69/08; H04L 67/025; H04W 4/70; H04W 4/30
See application file for complete search history.

(56) References Cited

FOREIGN PATENT DOCUMENTS

| | | | | |
|---|---|---|---|---|
| CN | 112822245 A | | 5/2021 | |
| JP | 2004318196 A | * | 11/2004 | |
| RU | 2374803 C2 | * | 12/2009 | ........... A01B 69/008 |
| UA | 123762 C2 | * | 6/2021 | ............. G06Q 10/06 |

OTHER PUBLICATIONS

UK Intellectual Property Office, Search Report for related UK Application No. GB2201441.9, dated Sep. 22, 2022, 3 pages.

* cited by examiner

```
┌─────────────────────────────────────────────────────────────────────────┐
│ Communicatively coupling, by an adapter, to electronic hardware and     │
│ software of a farming machine                                           │
│ 402                                                                     │
└─────────────────────────────────────────────────────────────────────────┘
                                    ↓
┌─────────────────────────────────────────────────────────────────────────┐
│ Sending, by the adapter, a machine ID of the hardware or the software   │
│ to a remote computing system                                            │
│ 404                                                                     │
└─────────────────────────────────────────────────────────────────────────┘
                                    ↓
┌─────────────────────────────────────────────────────────────────────────┐
│ Receiving by the adapter, from the remote computing system, a           │
│ provisioning configuration associated with the hardware or the software │
│ 406                                                                     │
└─────────────────────────────────────────────────────────────────────────┘
                                    ↓
┌─────────────────────────────────────────────────────────────────────────┐
│ Installing, by the adapter, the provisioning configuration              │
│ 408                                                                     │
└─────────────────────────────────────────────────────────────────────────┘
                                    ↓
┌─────────────────────────────────────────────────────────────────────────┐
│ Converting, by the adapter, source data, outputted by the electronic    │
│ hardware or the software of the farming machine, into structured data   │
│ according to the provisioning configuration                             │
│ 410                                                                     │
└─────────────────────────────────────────────────────────────────────────┘
                                    ↓
┌─────────────────────────────────────────────────────────────────────────┐
│ Sending, by the adapter, the structured data to the remote computing    │
│ system                                                                  │
│ 412                                                                     │
│                                                                         │
│ (the structured data is configured to be a compatible input for mapping │
│ processes that are based on a mapping configuration and hosted by the   │
│ remote computing system)                                                │
└─────────────────────────────────────────────────────────────────────────┘
```

Receiving, by the adapter, a mismatch signal representing a mismatch between the provisioning configuration and a signal outputted by the electronic hardware or the software of the farming machine
602

Uninstalling, by the adapter, the provisioning configuration
604

Receiving, by the adapter, signal outputted by the electronic hardware or the software of the farming machine
702

Determining, by the adapter, a mismatch between the provisioning configuration and the signal outputted by the electronic hardware or the software of the farming machine
704

Uninstalling, by the adapter, the provisioning configuration
706

Receiving, by the adapter, a mismatch signal representing a mismatch between the mapping configuration and the signal outputted by the electronic hardware or the software of the farming machine or some derivation thereof
902

↓

Uninstalling, by the adapter, the mapping configuration
904

Receiving, by the adapter, signal outputted by the electronic hardware or the software of the farming machine
1002

↓

Determining, by the adapter, a mismatch between the mapping configuration and the signal outputted by the electronic hardware or the software of the farming machine or some derivation thereof
1004

↓

Uninstalling, by the adapter, the mapping configuration
1006

FIG. 10

HARDWARE AGNOSTIC SYSTEMS FOR CONVERTING SOURCE SIGNALS OF AGRICULTURAL EQUIPMENT TO STRUCTURED SIGNALS FOR COMMUNICATION OVER COMPUTER NETWORKS

CROSS-REFERENCE TO RELATED APPLICATIONS

This application is a national phase entry under 35 U.S.C. § 371 of International Patent Application PCT/IB2022/061484, filed Nov. 28, 2022, designating the United States of America and published in English as International Patent Publication WO 2023/139426 A1 on Jul. 27, 2023, which claims the benefit of the filing date of U.S. Provisional Patent Application 63/266,941 "Hardware Agnostic Systems for Converting Source Signals of Agricultural Equipment to Structured Signals for Communication Over Computer Networks," filed Jan. 19, 2022, the entire disclosure of which is incorporated herein by reference.

TECHNICAL FIELD

The present disclosure relates to hardware agnostic systems, such as systems including an adapter, for converting electrical source signals of agricultural equipment to structured signals for communication to remote computing systems over computer networks.

BACKGROUND

Agriculture and farming has many Internet of Things (IoT) applications. For example, IoT can be used to collect data on temperature, soil moisture, rainfall, humidity, wind speed, pest infestation, and soil content in a crop field. Such data can be used to analyze and automate farming techniques. The data can also be used to make informed decisions, limit risk, enhance efficiencies, and improve management of crops. Data from sensors networked over the Internet, combined with a farmer's knowledge and intuition, can increase productivity.

In farming, one example problem faced by IoT applications is that often equipment is not compatible with commonly used computer communications protocols, such as MQTT and WebSocket. MQTT is a lightweight publish-subscribe network protocol that transports messages between devices and can run over TCP/IP or any network protocol that provides ordered, lossless, and bi-directional connections. MQTT is designed for connections with remote locations where resource constraints exist or the network bandwidth is limited. On the other hand, WebSocket is a more robust communications protocol, providing full-duplex communication channels over a TCP connection, typically. The WebSocket protocol enables simultaneous back-and-forth interaction between a web browser (or other client application) and a web server with lower overhead than half-duplex alternatives such as HTTP polling. WebSocket facilitates real-time data transfer from and to the server over full-duplex channels. This is a reason it is more robust that MQTT. Either way, often legacy farming equipment is not compatible with MQTT or WebSocket or other common protocols uses for communications over the Internet.

SUMMARY

Described herein are hardware agnostic technologies (including systems and methods) for converting electrical source signals of agricultural equipment to structured signals for communication to remote computing systems over computer networks. Such systems can include a hardware agnostic adapter and the methods can use the adapter. In general, described herein are technologies to enable farming equipment to connect and communicate with a remote computing system.

The technologies are hardware agnostic in that the technologies do not require special hardware adaptations and operate with different types of hardware and software systems to overcome compatibility issues of such systems in farming equipment. In some embodiments, a hardware agnostic adapter is configured to connect or integrate with farming equipment and communicate with a remote computing system. Also, the technologies are configured to convert source data (which, for example, describes hardware functions of equipment) into structured data and communicate the structured data to the remote system via a network configured to communicate the structured data but not necessarily configured to communicate the source data. In some examples, the conversion occurs according to a provisioning configuration or a mapping configuration installed in (such as by using the adapter) or associated with the farming equipment. In some embodiments, the mapping configuration specifically makes the adapter or the system agnostic.

Some embodiments include a hardware agnostic adapter configured to connect or integrate with farming equipment and securely communicate with remote computers (such as remote computers arranged for cloud computing). The adapter is configured to establish and secure a communication line between the farming equipment and the remote computers using a half-duplex network protocol or a publish-subscribe network protocol. Also, in some embodiments, the adapter is configured to establish and secure a communication line between the equipment and the remote computers using a full-duplex network protocol. The adapter or the remote computers (depending on the implementation of the adapter) is designed to convert source data (such as data describing hardware functions of farming equipment) into structured data. The conversion uses a mapping process, and the adapter or a remote computer (depending on the implementation) transmits the structured data as messages via a connection to a message receiving technology. In some embodiments, the remote servers provide a network communication broker as well as the mapping process. This is especially useful where a half-duplex or a publish-subscribe network protocol is used.

Some embodiments includes a system that includes a remote computing system (such as a cloud computing system) and an adapter. The adapter includes a computing system and is configured to communicatively couple to electronic hardware and software of a farming machine. The adapter is also configured to send a machine identification of the electronic hardware or the software to the remote computing system, in response to communicatively coupling to the electronic hardware and software. The adapter is also configured to receive, from the remote computing system, a provisioning configuration associated with the electronic hardware or the software. Also, the adapter is configured to convert source data, outputted by the electronic hardware or the software of the farming machine, into structured data according to the provisioning configuration. And, the adapter is configured to send the structured data to the remote computing system. The structured data is configured to be a compatible input for mapping processes that are based on a mapping configuration and hosted by the remote computing system.

In some of such embodiments, the remote computing system is configured to determine or select the mapping configuration, which is associated with the electronic hardware or the software of the farming machine, according to the machine identification. In some examples, the mapping configuration is configured to provide the provisioning configuration. Also, in some examples, the mapping configuration is configured to generate the provisioning configuration.

In some embodiments, the remote computing system is configured to determine or select the provisioning configuration, which is associated with the electronic hardware or the software of the farming machine, according to the machine identification. In some embodiments, the mapping configuration includes control logic configured to control communications, sent and received via the adapter, between remote computing systems and the electronic hardware or the software of the farming machine. In some of such examples, the mapping configuration includes polling logic configured to: poll for signal activity inbound to the electronic hardware or the software of the farming machine; and poll for signal activity outbound from the electronic hardware or the software of the farming machine.

In some embodiments, the mapping configuration includes conversion logic configured to: convert outbound signals of the electronic hardware or the software of the farming machine into farming event data; and format the farming event data for audio or visual presentation by a user interface. In some of such examples, the conversion logic is configured to associate the farming event data with the provisioning configuration.

In some embodiments, the provisioning configuration is configured to convert the source data into the structured data so that the structured data is transmittable via a computer network that is configured to communicate the structured data but not necessarily configured to communicate the source data. Also, the provisioning configuration is configured to perform a provisioning process that adjusts the adapter to be compatible with the electronic hardware or the software of the farming machine. In some of such embodiments, the adapter is configured to: install the provisioning configuration to be used by the adapter, in response to receiving the provisioning configuration sent from the remote computing system; and convert the source data, outputted by the electronic hardware or the software of the farming machine, into the structured data according to the installed provisioning configuration.

In some embodiments, the adapter is configured to uninstall the provisioning configuration, either: in response receiving a mismatch signal representing a mismatch between the provisioning configuration and a signal outputted by the electronic hardware or the software of the farming machine, or in response to determining a mismatch between the provisioning configuration and the signal outputted by the electronic hardware or the software of the farming machine.

In some embodiments, the adapter is configured to: install the mapping configuration to be used by the adapter, in response to receiving the mapping configuration sent from the remote computing system; and further convert the source data or convert the structured data into enhanced structured data according to the installed mapping configuration. In some of such examples, the adapter is configured to uninstall the mapping configuration, either: in response receiving a mismatch signal representing a mismatch between the mapping configuration and the signal outputted by the electronic hardware or the software of the farming machine or some derivation thereof, or in response to determining a mismatch between the mapping configuration and the signal outputted by the electronic hardware or the software of the farming machine or some derivation thereof.

In some embodiments, the machine identification is based on or includes a hardware pin or an onboard software configuration of the farming machine, and the adapter is configured to generate the machine identification based on the hardware pin or the onboard software configuration of the farming machine.

In some embodiments, the remote computing system includes a network communication broker independent of or in combination with the mapping configuration, and the adapter and the remote computing system communicate using a half-duplex protocol.

In some embodiments, the remote computing system includes a network communication broker independent of or in combination with the mapping configuration, and the adapter and the remote computing system communicate using a publisher-subscriber network protocol.

In providing hardware agnostic technologies for converting electrical source signals of agricultural equipment to structured signals for communication to remote computing systems, the systems and methods described herein overcome some technical problems in computer networking applications in farming, in general, as well as some technical problems in IoT applications in farming. Also, the techniques disclosed herein provide specific technical solutions to at least overcome the technical problems mentioned in the background section or other parts of the application as well as other technical problems not described herein but recognized by those skilled in the art.

With respect to some embodiments, disclosed herein are computerized methods for providing hardware agnostic technologies for converting electrical source signals of agricultural equipment to structured signals for communication to remote computing systems, as well as a non-transitory computer-readable storage medium for carrying out technical operations of the computerized methods. The non-transitory computer-readable storage medium has tangibly stored thereon, or tangibly encoded thereon, computer readable instructions that when executed by one or more devices (e.g., one or more personal computers or servers) cause at least one processor to perform a method for improved systems and methods for providing hardware agnostic technologies for converting electrical source signals of agricultural equipment to structured signals for communication to remote computing systems.

For example, in some embodiments, a method includes communicatively coupling, by an adapter (which includes a computing system), to electronic hardware and software of a farming machine, and sending, by the adapter, a machine identification of the electronic hardware or the software to a remote computing system (in response to communicatively coupling to the electronic hardware and software to the adapter). The method also includes receiving by the adapter, from the remote computing system, a provisioning configuration associated with the electronic hardware or the software. The method also includes converting, by the adapter, source data, outputted by the electronic hardware or the software of the farming machine, into structured data according to the provisioning configuration. Also, the method includes sending, by the adapter, the structured data to the remote computing system. The structured data is configured to be a compatible input for mapping processes that are based on a mapping configuration and hosted by the remote computing system.

With respect to some embodiments, a system is provided that includes at least one computing device configured to provide improved ways for providing hardware agnostic technologies for converting electrical source signals of agricultural equipment to structured signals for communication to remote computing systems. And, with respect to some embodiments, a method, such as one of the aforesaid methods, is provided to be performed by at least one computing device. In some example embodiments, computer program code can be executed by at least one processor of one or more computing devices to implement functionality in accordance with at least some embodiments described herein; and the computer program code being at least a part of or stored in a non-transitory computer-readable medium.

These and other important aspects of the invention are described more fully in the detailed description below. The invention is not limited to the particular methods and systems described herein. Other embodiments can be used and changes to the described embodiments can be made without departing from the scope of the claims that follow the detailed description.

BRIEF DESCRIPTION OF THE DRAWINGS

The present disclosure will be understood more fully from the detailed description given below and from the accompanying drawings of various embodiments of the disclosure.

DETAILED DESCRIPTION OF EXAMPLE EMBODIMENTS

Details of example embodiments of the invention are described in the following detailed description with reference to the drawings. Although the detailed description provides reference to example embodiments, it is to be understood that the invention disclosed herein is not limited to such example embodiments. But to the contrary, the invention disclosed herein includes numerous alternatives, modifications and equivalents as will become apparent from consideration of the following detailed description and other parts of this disclosure.

Figure 1:
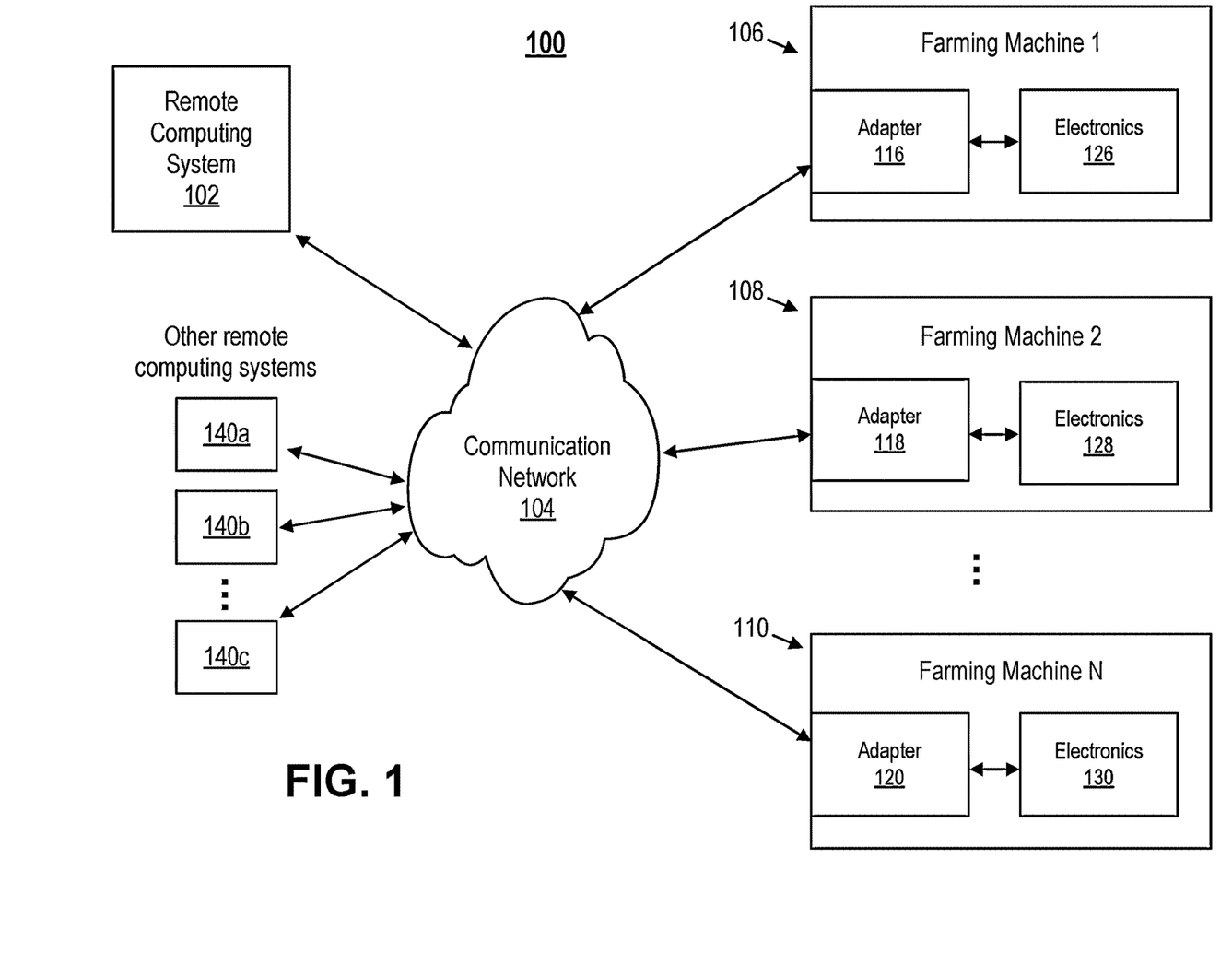
FIG. 1 illustrates an example network of farming machines that communicate with remote computing systems through a communication network, in accordance with some embodiments of the present disclosure.

FIG. 1 illustrates a network 100 of farming machines that communicate with remote computing systems through a communication network. Specifically, FIG. 1 illustrates the network 100 including a remote computing system 102, a communication network 104, farming machines (e.g., see farming machines 106, 108, and 110), and additional remote computing systems (e.g., see remote computing systems 140a, 140b, and 140c). The remote computing systems (e.g., see remote computing systems 102, 140a, 140b, and 140c) are remote in that each system is physically and geographically separated from the farming machines of the network 100. The farming machines are shown communicating with remote computing systems of the network 100 through a communication network 104. Not shown in FIG. 1, the farming machines of the network 100 can each include its own computing system. A computing system of a farming machine can include a processor, memory, a communication interface and one or more sensors that can make the farming machines individual computing devices. In the case of the communication network 104 including the Internet, the farming machines of the network 100 are considered Internet of Things (IoT) devices. Also, in some embodiments, the remote computing system is a cloud computing system.

As shown in FIG. 1, each one of the farming machines includes a respective adapter and respective electronics (e.g., see adapters 116, 118, and 120, and see electronics 126, 128, and 130). In some embodiments, the electronics of the farming machines includes electronic hardware and software of the farming machines. And, in such embodiments and others, the adapters are part of a hardware agnostic system or each adapter is a hardware agnostic adapter. The system or the adapter is hardware agnostic in that the technology does not require special hardware adaptations and operates with different types of hardware and software systems to overcome compatibility issues of such systems in farming equipment. In some embodiments, a hardware agnostic adapter is configured to connect or integrate with farming equipment and communicate with a remote computing system. Also, the technologies can convert source data (which, for example, describes hardware functions of equipment) into structured data and communicate the structured data to the remote system via a network configured to communicate the structured data but not necessarily configured to communicate the source data. The conversion can occur according to a provisioning configuration or a mapping configuration installed in (such as by using the adapter) or associated with the farming equipment.

In some embodiments, a hardware agnostic system includes a remote computing system (such as remote computing system 102) and an adapter (such as any of on the adapters of network 100, e.g., see adapters 116, 118, and 120). In such embodiments, the adapter of the system is configured to communicatively couple to electronic hardware and software (e.g., see electronics 126) of a farming machine (e.g., see farming machine 106). In some embodiments, a farming machine interface of the adapter communicatively couples the hardware and software of the farming machine to the adapter (e.g., see farming machine interface 316 of adapter 300 shown in FIG. 3). The adapter is also configured to send a machine identification of the electronic hardware or the software to the remote computing system, in response to communicatively coupling to the electronic hardware and software. The adapter is also configured to receive, from the remote computing system, a provisioning configuration associated with the electronic hardware or the software (e.g., see provisioning configurations 226 shown in FIG. 2 and provisioning configuration 324 shown in FIG. 3). The adapter is also configured to convert source data, outputted by the electronic hardware or the software of the farming machine, into structured data according to the provisioning configuration as well as send the structured data to the remote computing system. The structured data is configured to be a compatible input for mapping processes (e.g., see mapping processes 224 shown in FIG. 2) that are based on a mapping configuration (e.g., see mapping configuration 222 shown in FIG. 2 and mapping configuration 326 shown in FIG. 3) and hosted by the remote computing system (e.g., see mapping configuration 222).

In some embodiments, it is the mapping configuration that makes the adapter or the system agnostic. For example, in order to read signals off a controller board, the adapter, while it is polling, needs to identify the connected hardware pin and onboard software configuration of the electronics of the farming machine. Adding the mapping on the adapter makes communication between the two boards possible; however, in legacy farming equipment mapping may not exist and known adapters may be specific to certain communications protocols. A unique attribute of the adapter described herein is that it has no configuration mapping installed initially, so that it can install appropriate mapping according to an identification of the particular farming equipment connected to the adapter. The command mapping for communicating with the farming hardware, and the business logic that polls for signal activity and converts the outgoing signals to farming event data is stored in the cloud and can be communicated to the adapter to be load on the adapter. The adapter configuration occurs as a provisioning functionality of the adapter makes an initial connection to the cloud after being attached to farming machine's hardware. This functionality ships the necessary command mapping and installs onto the adapter as a part of a registration step during the machine's initial connection. The data conversion mapping for signal translation into farming event data also gets associated with the unique installation once the equipment comes online and begins to send its signals to a server that provided the mapping (such as a server in a cloud computing environment). If the adapter is disconnected and installed onto another piece of equipment, the server can recognize the mapping mismatch and send a reconfiguration command. The adapter response to said command will be to clear the onboard mapping and disassociate the signal translation logic. It will then repeat the initial connection steps and reconfigure itself to match the new farming equipment to which it is connected. In this way, for example, the adapter is agnostic.

In some of the aforementioned embodiments, the remote computing system (e.g., see remote computing system 102) is configured to determine or select the mapping configuration, which is associated with the electronic hardware or the software of the farming machine, according to the machine identification. In some embodiments, the mapping configuration is configured to provide the provisioning configuration (e.g., see FIG. 2). In some embodiments, the mapping configuration is configured to generate the provisioning configuration (e.g., see FIG. 2). In some embodiments, the remote computing system is configured to determine or select the provisioning configuration, which is associated with the electronic hardware or the software of the farming machine, according to the machine identification (e.g., see the received or generated machine identification 322 shown in FIG. 3).

Figure 2:
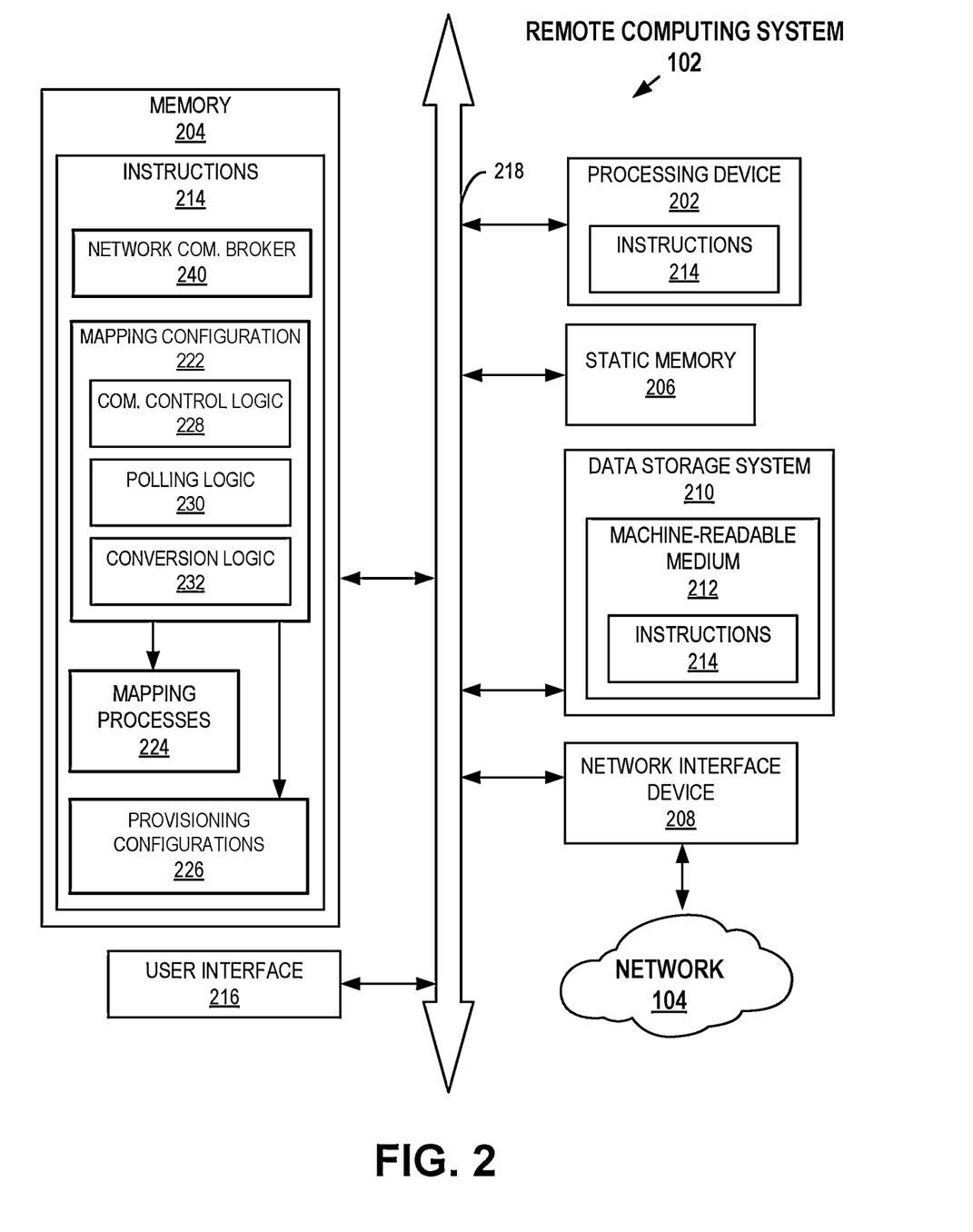
FIG. 2 illustrates is a block diagram of example aspects of the remote computing system 102 shown in FIG. 1, in accordance with some embodiments of the present disclosure.

In some embodiments, the mapping configuration includes control logic configured to control communications, sent and received via the adapter, between remote computing systems and the electronic hardware or the software of the farming machine (e.g., see communication control logic 228 shown in FIG. 2). In some of such embodiments, the mapping configuration or the control logic includes polling logic (e.g., see polling logic 230 shown in FIG. 2) configured to poll for signal activity inbound to the electronic hardware or the software of the farming machine. In such embodiments, the polling logic is also configured to poll for signal activity outbound from the electronic hardware or the software of the farming machine.

In some embodiments, the mapping configuration includes conversion logic configured to convert outbound signals of the electronic hardware or the software of the farming machine into farming event data (e.g., see conversion logic 232 shown in FIG. 2). Also, the conversion logic is configured to format the farming event data for audio or visual presentation by a user interface. Also, in some instances, the conversion logic is configured to associate the farming event data with the provisioning configuration.

Figure 3:
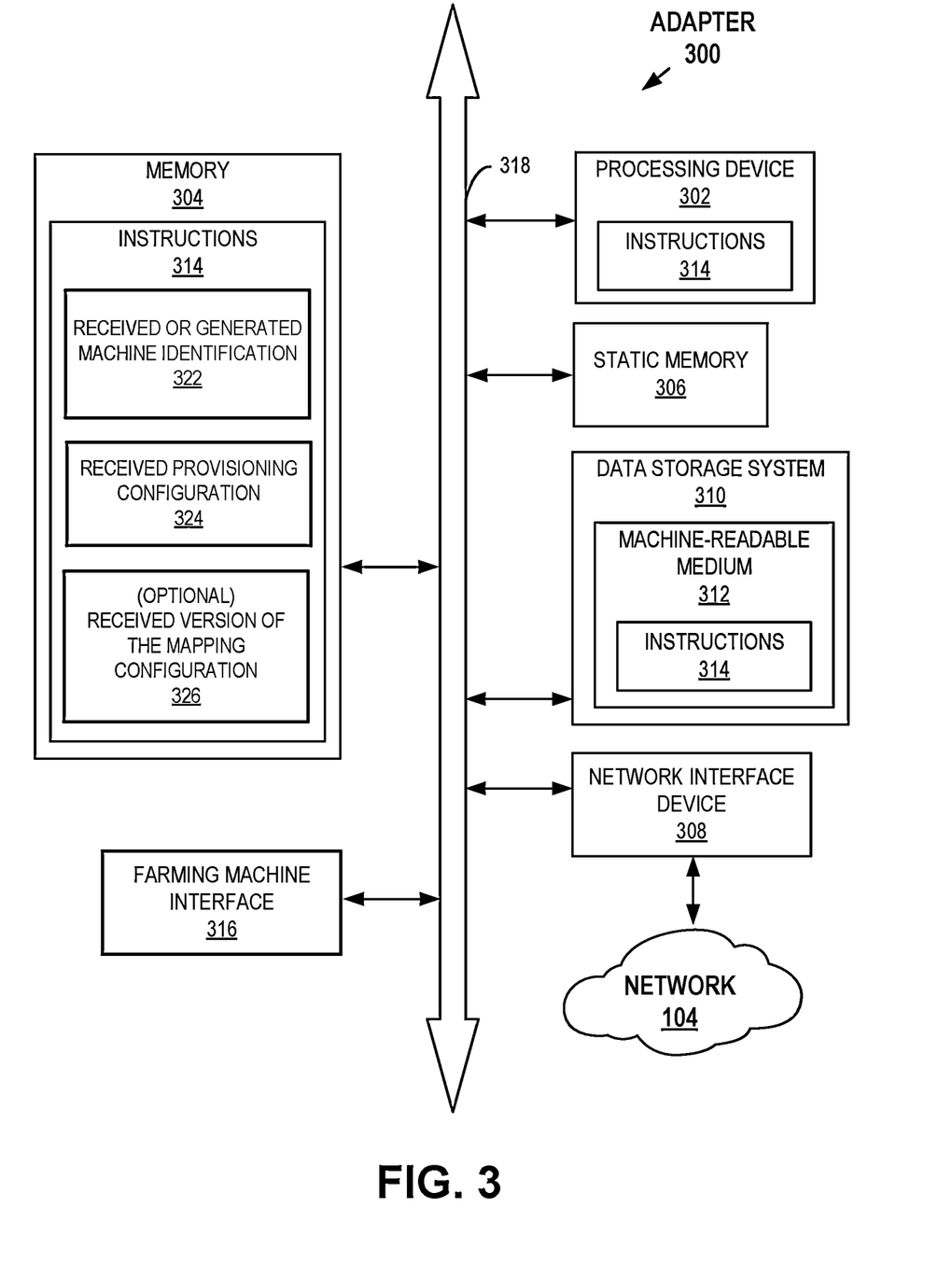
FIG. 3 illustrates is a block diagram of example aspects of an adapter (such as one of adapters 116, 118, and 120 shown in FIG. 1), in accordance with some embodiments of the present disclosure.

In some embodiments, the provisioning configuration (e.g., see provisioning configuration 324) is configured to convert the source data into the structured data so that the structured data is transmittable via a computer network that is configured to communicate the structured data but not necessarily configured to communicate the source data (e.g., see communication network 104). Also, in such examples, the provisioning configuration is configured to perform a provisioning process that adjusts the adapter to be compatible with the electronic hardware or the software of the farming machine.

In some embodiments, the adapter (e.g., see adapter 116) is configured to install the provisioning configuration (e.g., see provisioning configuration 324) to be used by the adapter, in response to receiving the provisioning configuration sent from the remote computing system (e.g., see remote computing system 102). The adapter is also configured to convert the source data, outputted by the electronic hardware or the software of the farming machine (e.g., see electronics 126), into the structured data according to the installed provisioning configuration (e.g., see provisioning configuration 324). In some of such examples, the adapter is configured to uninstall the provisioning configuration, in response receiving a mismatch signal representing a mismatch between the provisioning configuration and a signal outputted by the electronic hardware or the software of the farming machine. In other examples, the adapter is configured to uninstall the provisioning configuration, in response to determining a mismatch between the provisioning configuration and the signal outputted by the electronic hardware or the software of the farming machine.

In some embodiments, the adapter is configured to install the mapping configuration to be used by the adapter, in response to receiving the mapping configuration sent from the remote computing system (e.g., see mapping configuration 326 shown in FIG. 3). In such examples, the adapter is also configured to further convert the source data or convert the structured data into enhanced structured data according to the installed mapping configuration. Furthermore, in some of such embodiments, the adapter is configured to uninstall the mapping configuration, in response receiving a mismatch signal representing a mismatch between the mapping configuration and the signal outputted by the electronic hardware or the software of the farming machine or some derivation thereof. Or, some other instances, the adapter is configured to uninstall the mapping configuration, in response to determining a mismatch between the mapping configuration and the signal outputted by the electronic hardware or the software of the farming machine or some derivation thereof.

In some embodiments, the machine identification is based on or includes a hardware pin or an onboard software configuration of the farming machine, and the adapter is configured to generate the machine identification based on the hardware pin or the onboard software configuration of the farming machine.

In some embodiments, the remote computing system includes a network communication broker independent of or in combination with the mapping configuration (e.g., see network communication broker 240 of remote computing system 102 shown in FIG. 2). Also, in some of such examples, the adapter and the remote computing system communicate using a half-duplex protocol. In other examples, the adapter and the remote computing system communicate using a publisher-subscriber network protocol. In some of such some embodiments, the adapter and the remote computing system also communicate using a half-duplex protocol, and the adapter and the remote computing system switch between using the half-duplex protocol and the publisher-subscriber network protocol based on a set of criteria.

The communication network 104 includes one or more local area networks (LAN(s)) and/or one or more wide area networks (WAN(s)). In some embodiments, the communication network 104 includes the Internet and/or any other type of interconnected communications network. The communication network 104 can also include a single computer network or a telecommunications network. More specifically, in some embodiments, the communication network 104 includes a local area network (LAN) such as a private computer network that connects computers in small physical areas, a wide area network (WAN) to connect computers located in different geographical locations, and/or a middle area network (MAN) to connect computers in a geographic area larger than that covered by a large LAN but smaller than the area covered by a WAN.

At least each shown component of the network 100 (including remote computing systems 102, 140a, 140b, and 140c, communication network 104, and farming machines 106, 108, and 110) can be or include a computing system which includes memory that includes media. The media includes or is volatile memory components, non-volatile memory components, or a combination of thereof. In general, in some embodiments, each of the computing systems includes a host system that uses memory. For example, the host system writes data to the memory and read data from the memory. The host system is a computing device that includes a memory and a data processing device. The host system includes or is coupled to the memory so that the host system reads data from or writes data to the memory. The host system is coupled to the memory via a physical host interface. The physical host interface provides an interface for passing control, address, data, and other signals between the memory and the host system.

Some more specific embodiments can include a hardware agnostic adapter configured to connect or integrate with farming equipment and securely communicate with remote computers (such as remote computers arranged for cloud computing). In such examples, the adapter is configured to establish and secure a communication line between the equipment and the remote computers using a half-duplex network protocol or a publish-subscribe network protocol. Also, in some embodiments, the adapter is configured to establish and secure a communication line between the equipment and the remote computers using a full-duplex network protocol (e.g., WebSocket protocol). Using a network protocol that is light-weight weight, publisher-subscriber based, and lossless (such as MQTT) is advantageous with farming equipment networking because using less resources (such as power) is preferred over performance, and such a protocol can provide reliable communications even when connections made with the equipment are not continuous. On the other hand, using a more robust network protocol, such as a full-duplex protocol, is advantageous because some farming equipment or aspects of the equipment may have additional networking barriers, such as firewalls, or may require continuous connection to operate efficiently.

In such embodiments, the adapter or the remote computers (depending on the implementation of the adapter) is designed to convert source data, which describes hardware functions of farming equipment, into structured data. The conversion uses a mapping process, and the adapter or a remote computer (depending on the implementation) transmits the structured data as messages via an Internet connection to a message receiving technology. In some embodiments, the remote servers provide a network communication broker as well as the mapping process (e.g., see network communication broker 240 of remote computing system 200 shown in FIG. 2). This is especially useful where a half-duplex or a publish-subscribe network protocol is used.

The message receiving technology can be any technology that can handle at least one of the aforementioned network protocols (telephones, IoT storage technologies, messenger technologies, etc.). The message receiving technology can also monitor farming equipment health and is able to send diagnostic data back to the remote computers or the adapter. The software of this product can handle two-way communications to pass command and control messages into the hardware and self-update commands. It can receive files for writing into its own package and send the containing operating system signals for service restarts when necessary. Also, the technology can be installed onto the chipset in the hardware, or on an independent piece of hardware (e.g., a USB storage device such as a USB stick) and connect through an available port, or directly through circuit board circuitry, into the monitored hardware.

FIG. 2 illustrates is a block diagram of example aspects of the remote computing system 102 shown in FIG. 1. FIG. 2 illustrates parts of the remote computing system 102 within which a set of instructions, for causing a machine (such as a computer processor or processing device 202) to perform any one or more of the methodologies discussed herein performed by a remote computing system, are executed (e.g., see method 500). In some embodiments, the remote computing system 102 corresponds to a host system that includes, is coupled to, or utilizes memory or is used to perform the operations performed by any one of the remote computing systems described herein. In some embodiments, the machine is connected (e.g., networked) to other machines in a LAN, an intranet, an extranet, or the Internet. In some embodiments, the machine operates in the capacity of a server in client-server network environment, as a peer machine in a peer-to-peer (or distributed) network environment, or as a server in a cloud computing infrastructure or environment. In some embodiments, the machine is a personal computer (PC), a tablet PC, a cellular telephone, a web appliance, a server, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein performed by remote computing systems.

The remote computing system 102 includes a processing device 202, a main memory 204 (e.g., read-only memory (ROM), flash memory, dynamic random-access memory (DRAM), etc.), a static memory 206 (e.g., flash memory, static random-access memory (SRAM), etc.), and a data storage system 210, which communicate with each other via a bus 218. The processing device 202 represents one or more general-purpose processing devices such as a microprocessor, a central processing unit, or the like. More particularly, the processing device can include a microprocessor or a processor implementing other instruction sets, or processors implementing a combination of instruction sets. Or, the processing device 202 is one or more special-purpose processing devices such as an application specific integrated circuit (ASIC), a field programmable gate array (FPGA), a digital signal processor (DSP), network processor, or the like. The processing device 202 is configured to execute instructions 214 for performing the operations discussed herein performed by a remote computing system. In some embodiments, the remote computing system 102 includes a network interface device 208 to communicate over the communication network 104 shown in FIG. 1.

The data storage system 210 includes a machine-readable storage medium 212 (also known as a computer-readable medium) on which is stored one or more sets of instructions 214 or software embodying any one or more of the methodologies or functions described herein performed by a remote computing system. The instructions 214 also reside, completely or at least partially, within the main memory 204 or within the processing device 202 during execution thereof by the remote computing system 102, the main memory 204 and the processing device 202 also constituting machine-readable storage media.

In some embodiments, the instructions 214 include instructions to implement functionality corresponding to any one of the computing devices, data processors, user interface devices, and I/O devices described herein related to a remote computing system. For example, the instructions 214 include mapping configuration 222 which is configured to generate and provide the provisioning configurations 226 (which are also a part of the instructions 214). In some embodiments, the mapping configuration 222 is also configured to generate and provide the mapping processes 224 (which are also a part of the instructions 214). Also, the structured data mentioned herein is configured to be a compatible input for the mapping processes 224 that are based on the mapping configuration 222, which are both shown as being hosted by the remote computing system 102 in FIG. 2.

Also shown, the mapping configuration 222 includes communication control logic 228, which is configured to control communications, sent and received via the adapter, between remote computing systems and the electronic hardware or the software of the farming machine. Also shown, the mapping configuration 222 includes the polling logic 230, which is configured to poll for signal activity inbound to the electronic hardware or the software of the farming machine as well as poll for signal activity outbound from the electronic hardware or the software of the farming machine. Also shown, the mapping configuration 222 includes conversion logic 232, which is configured to convert outbound signals of the electronic hardware or the software of the farming machine into farming event data. Also, the conversion logic 232 is configured to format the farming event data for audio or visual presentation by a user interface as well as associate the farming event data with the provisioning configuration.

While the machine-readable storage medium 212 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure performed a remote computing system. The term "machine-readable storage medium" shall accordingly be taken to include solid-state memories, optical media, or magnetic media.

Also, as shown, remote computing system 102 includes user interface 216 that includes a display, in some embodiments, and, for example, implements functionality corresponding to any one of the user interface devices disclosed herein. A user interface, such as user interface 216, or a user interface device described herein includes any space or equipment where interactions between humans and machines occur. A user interface described herein allows operation and control of the machine from a human user, while the machine simultaneously provides feedback information to the user. Examples of a user interface (UI), or user interface device include the interactive aspects of computer operating systems (such as graphical user interfaces), machinery operator controls, and process controls. A UI described herein includes one or more layers, including a human-machine interface (HMI) that interfaces machines with physical input hardware and output hardware.

FIG. 3 illustrates is a block diagram of example aspects of an adapter 300 (which can be one of the adapters 116, 118, and 120 shown in FIG. 1). In some embodiments, as shown in FIG. 3, the adapter 300 is a computing system. FIG. 3 illustrates parts of the adapter 300 within which a set of instructions, for causing a machine (such as a computer processor or processing device 302) to perform any one or more of the methodologies discussed herein performed by an adapter, are executed. In some embodiments, the adapter 300 corresponds to a host system that includes, is coupled to, or utilizes memory or is used to perform the operations performed by any one of the computing devices and data processors described herein related to the adapter. In alternative embodiments, the machine is connected (e.g., networked) to other machines in a LAN, an intranet, an extranet, or the Internet. In some embodiments, the machine operates in the capacity of a client machine in client-server network environment, as a peer machine in a peer-to-peer (or distributed) network environment, or as a client machine in a cloud computing infrastructure or environment. In some embodiments, the machine is a personal computer (PC), a tablet PC, a cellular telephone, a web appliance, a server, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein related to the adapter.

The adapter 300 includes a processing device 302, a main memory 304 (e.g., read-only memory (ROM), flash memory, dynamic random-access memory (DRAM), etc.), a static memory 306 (e.g., flash memory, static random-access memory (SRAM), etc.), and a data storage system 310, which communicate with each other via a bus 318. The processing device 302 represents one or more general-purpose processing devices such as a microprocessor, a central processing unit, or the like. More particularly, the processing device can include a microprocessor or a processor implementing other instruction sets, or processors implementing a combination of instruction sets. Or, the processing device 302 is one or more special-purpose processing devices such as an application specific integrated circuit (ASIC), a field programmable gate array (FPGA), a digital signal processor (DSP), network processor, or the like. The processing device 302 is configured to execute instructions 314 for performing the operations discussed herein performed by the adapter. In some embodiments, the adapter 300 includes a network interface device 308 to communicate over the communication network 104 shown in FIG. 1.

The data storage system 310 includes a machine-readable storage medium 312 (also known as a computer-readable medium) on which is stored one or more sets of instructions 314 or software embodying any one or more of the methodologies or functions described herein performed by the adapter. The instructions 314 also reside, completely or at least partially, within the main memory 304 or within the processing device 302 during execution thereof by the adapter 300, the main memory 304 and the processing device 302 also constituting machine-readable storage media.

Also, as shown, the adapter 300 includes a farming machine interface 316 that includes computer hardware and software configured to interface and communicatively couple to electronics of any one of the farming machines described herein (e.g., see electronics 126, 128, and 130).

In some embodiments, the instructions 314 include instructions to implement functionality corresponding to any one of the computing devices, data processors, user interface devices, and I/O devices described herein related to the adapter. For example, the instructions 314 include the received or generated machine identification 322 as well as the received provisioning configuration 324 and, optionally, the received version of the mapping configuration 326.

While the machine-readable storage medium 312 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure performed an adapter. The term "machine-readable storage medium" shall accordingly be taken to include solid-state memories, optical media, or magnetic media.

FIGS. 4 to 10 illustrate methods 400, 500, 600, 700, 800, 900, and 1000, respectively, in accordance with various embodiments of the present disclosure. Methods 400, 600, 700, 800, 900, and 1000 are perform by various embodiments of the adapter (such as adapters 116, 118, 120, and 300). Method 500 is performed by the remote computing system (such as remote computing system 102).

Figure 4:
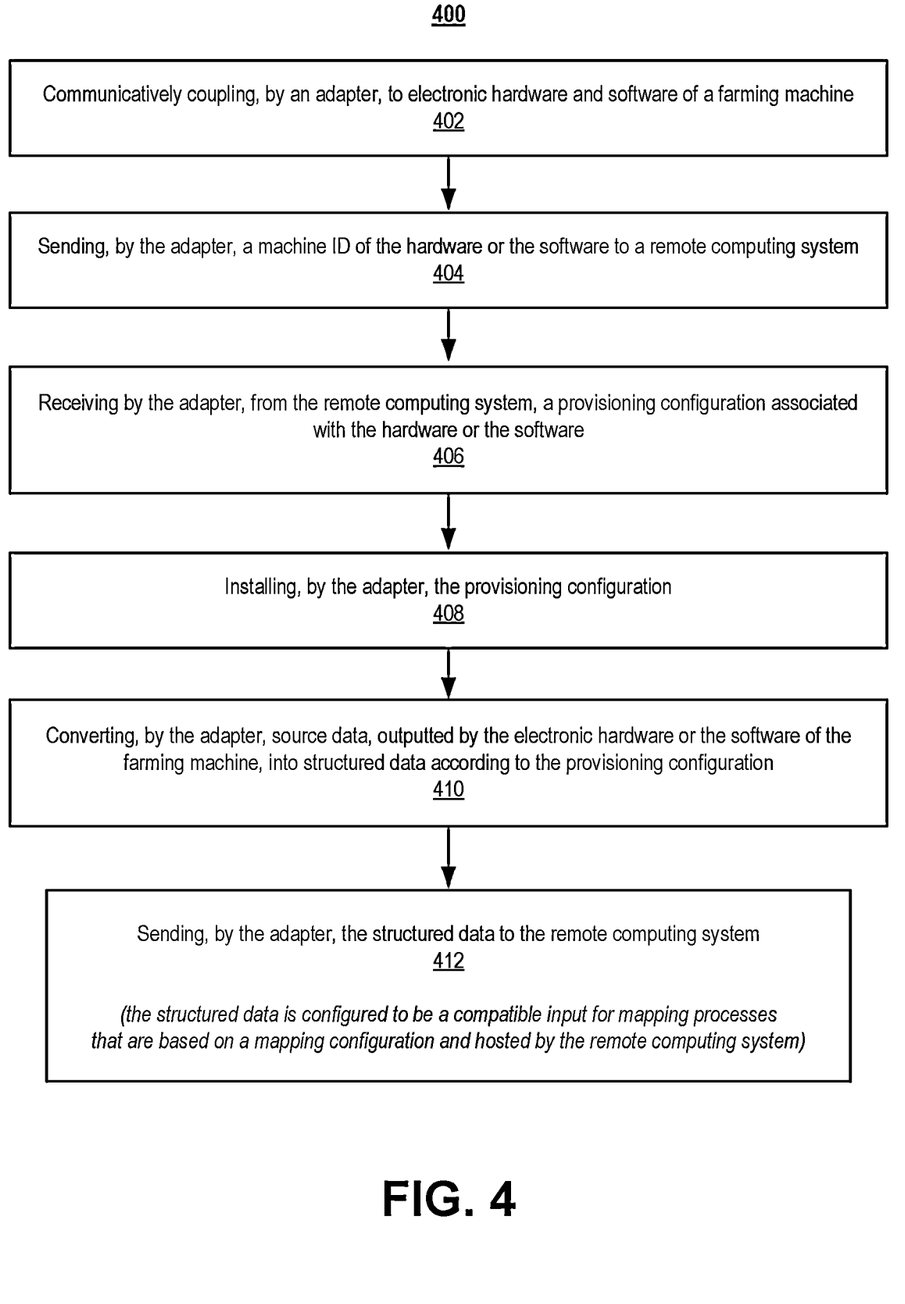
FIGS. 4 to 10 illustrate methods in accordance with some embodiments of the present disclosure.

Method 400 begins with step 402, which includes communicatively coupling, by an adapter, to electronic hardware and software of a farming machine. In some embodiments, a farming machine interface of the adapter communicatively couples the hardware and software of the farming machine to the adapter (e.g., see farming machine interface 316 of adapter 300 shown in FIG. 3). At step 404, the method 400 continues with sending, by the adapter, a machine identification of the electronic hardware or the software to a remote computing system, in response to communicatively coupling to the electronic hardware and software to the adapter (e.g., see the received or generated machine identification 322 of instructions 314 of the adapter 300 shown in FIG. 3). At step 406, the method 400 continues with receiving by the adapter, from the remote computing system, a provisioning configuration associated with the electronic hardware or the software (e.g., see the received provisioning configuration 324 of instructions 314 of the adapter 300 shown in FIG. 3). At step 408, the method 400 continues with installing, by the adapter, the provisioning configuration. At step 410, the method 400 continues with converting, by the adapter, source data, outputted by the electronic hardware or the software of the farming machine, into structured data according to the provisioning configuration. At step 412, the method 400 continues with sending, by the adapter, the structured data to the remote computing system. In method 400, the structured data is configured to be a compatible input for mapping processes that are based on a mapping configuration and hosted by the remote computing system (e.g., see mapping processes 224 of instructions 214 of the remote computing system 102 shown in FIG. 2).

Figure 5:
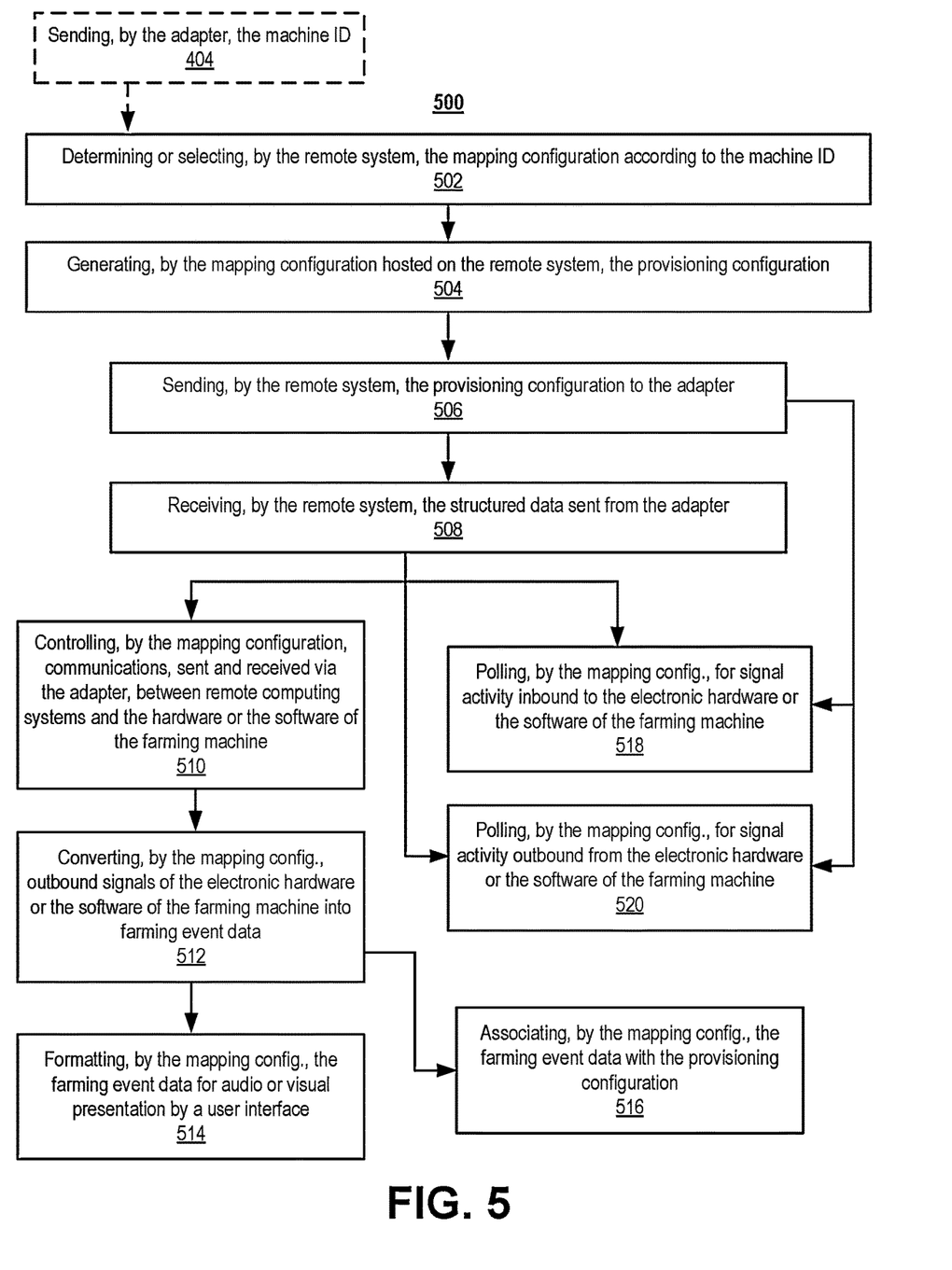

Method 500 begins with step 502, which includes determining or selecting, by the remote computing system, the mapping configuration according to the machine identification (e.g., see mapping configuration 222 shown in FIG. 2). The method 500 commences as well as step 502 commences after the remote computing system receives the machine identification, which is sent from the adapter in step 404 of method 400 (see FIG. 4). At step 504, the method 500 continues with generating, by the mapping configuration hosted on the remote computing system, the provisioning configuration (e.g., see provisioning configurations 226 shown in FIG. 2). At step 506, the method 500 continues with sending, by the remote system, the provisioning configuration to the adapter. At step 508, the method 500 continues with receiving, by the remote system, the structured data sent from the adapter.

At step 510, the method 500 continues with controlling, by the mapping configuration, communications, sent and received via the adapter, between remote computing systems and the hardware or the software of the farming machine. At step 512, the method continues with converting, by the mapping configuration, outbound signals of the electronic hardware or the software of the farming machine into farming event data. At step 514, the method continues with formatting, by the mapping configuration, the farming event data for audio or visual presentation by a user interface. At step 516, the method continues with associating, by the mapping configuration, the farming event data with the provisioning configuration. As shown, steps 514 and 516 can occur simultaneously after step 512.

At step 518, the method 500 continues with polling, by the mapping configuration, for signal activity inbound to the electronic hardware or the software of the farming machine. At step 520, the method 500 continues polling, by the mapping configuration, for signal activity outbound from the electronic hardware or the software of the farming machine. As shown, steps 518 and 520 can occur after step 506 or step 508.

Figure 6:
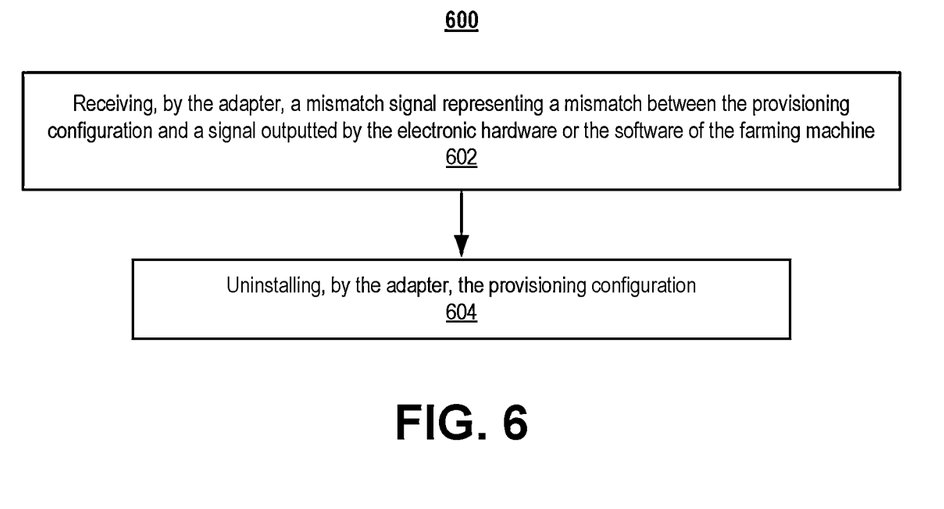

Turning back to operations performed by the adapter, method 600 commences with receiving, by the adapter, a mismatch signal representing a mismatch between the provisioning configuration and a signal outputted by the electronic hardware or the software of the farming machine (at step 602). Method 600 continues with uninstalling, by the adapter, the provisioning configuration (at step 604).

Figure 7:
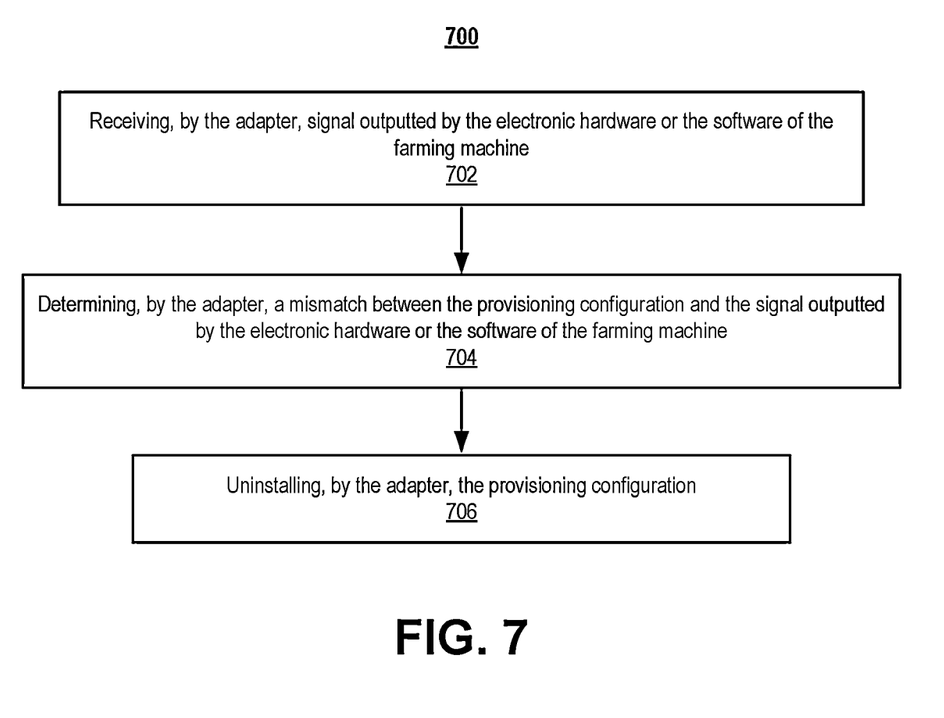

Alternatively, method 700 commences with receiving, by the adapter, signal outputted by the electronic hardware or the software of the farming machine (at step 702), and continues with determining, by the adapter, a mismatch between the provisioning configuration and the signal outputted by the electronic hardware or the software of the farming machine (at step 704). At step 706, the method 700 continues with uninstalling, by the adapter, the provisioning configuration.

Figure 8:
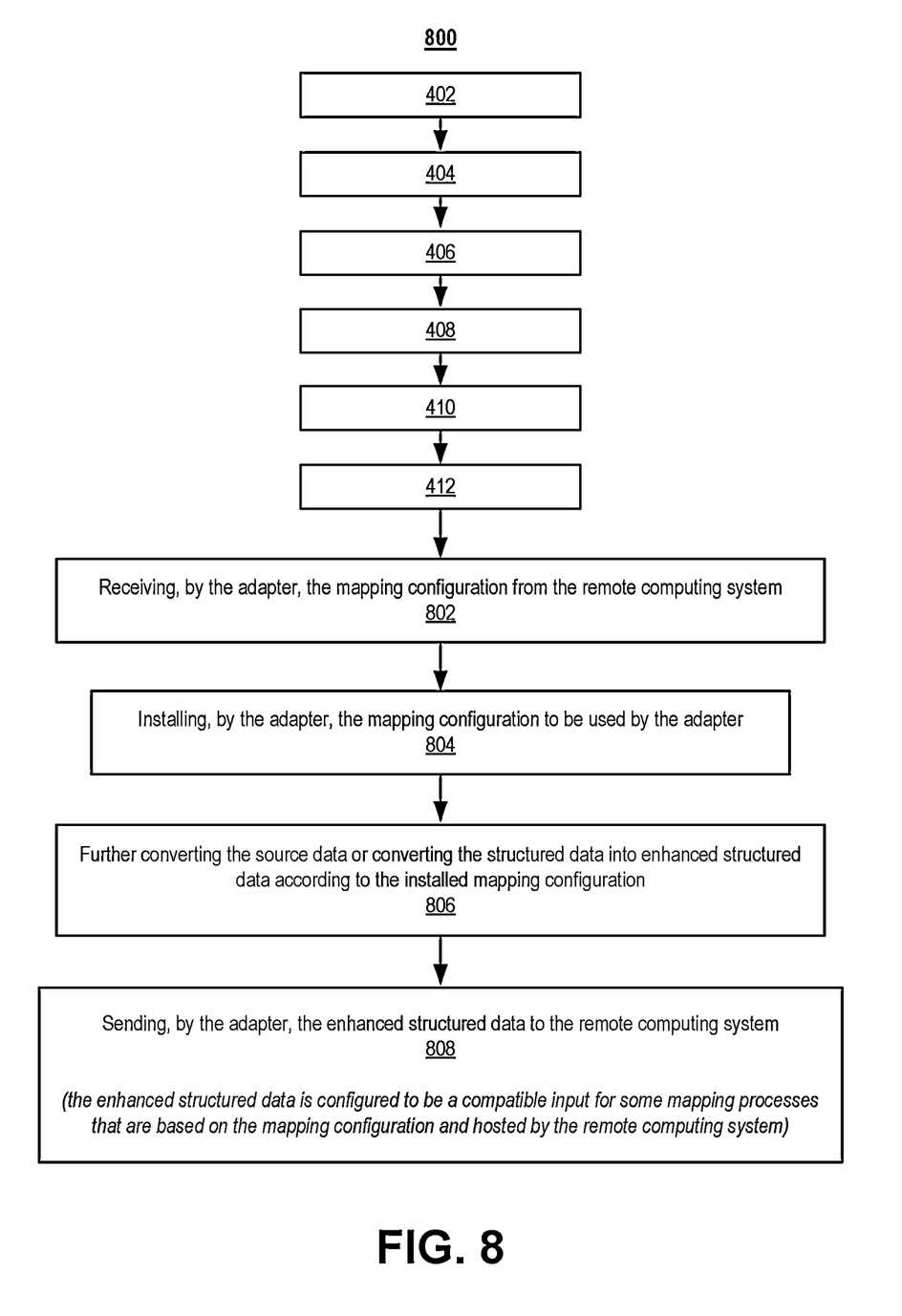

Method 800 includes the steps of method 400 (shown in FIG. 4) as well as additional steps 802 through 808. Method 800 starts with the steps of method 400 and then continues with step 802, which includes receiving, by the adapter, the mapping configuration from the remote computing system (e.g., see the received version of the mapping configuration 326 of instructions 314 of the adapter 300 shown in FIG. 3). At step 804, the method 800 continues with installing, by the adapter, the mapping configuration to be used by the adapter. At step 806, the method 800 continues with further converting the source data or converting the structured data into enhanced structured data according to the installed mapping configuration. At step 808, the method continues with sending, by the adapter, the enhanced structured data to the remote computing system. The enhanced structured data is configured to be a compatible input for some mapping processes that are based on the mapping configuration and hosted by the remote computing system.

Figure 9:
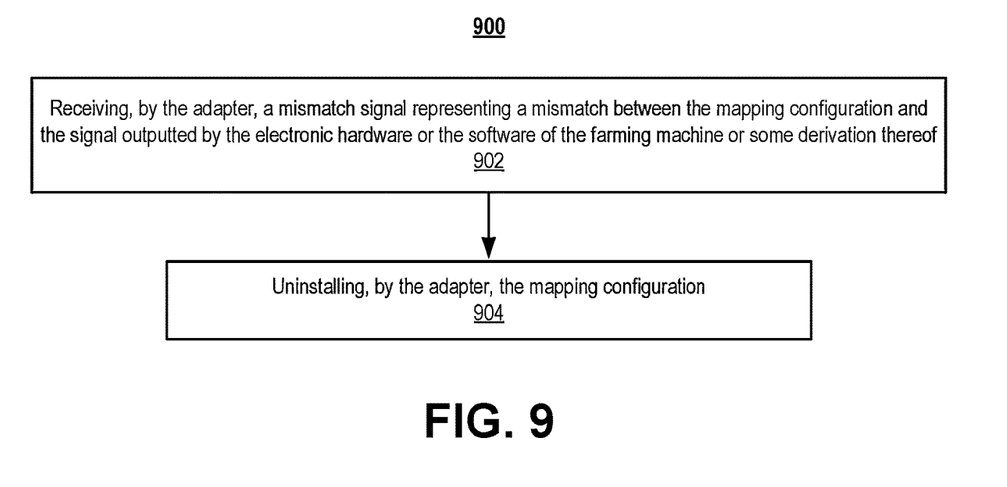

Method 900 starts with step 902, which includes receiving, by the adapter, a mismatch signal representing a mismatch between the mapping configuration and the signal outputted by the electronic hardware or the software of the farming machine or some derivation thereof. At step 904, the method continues with uninstalling, by the adapter, the mapping configuration.

Figure 10:
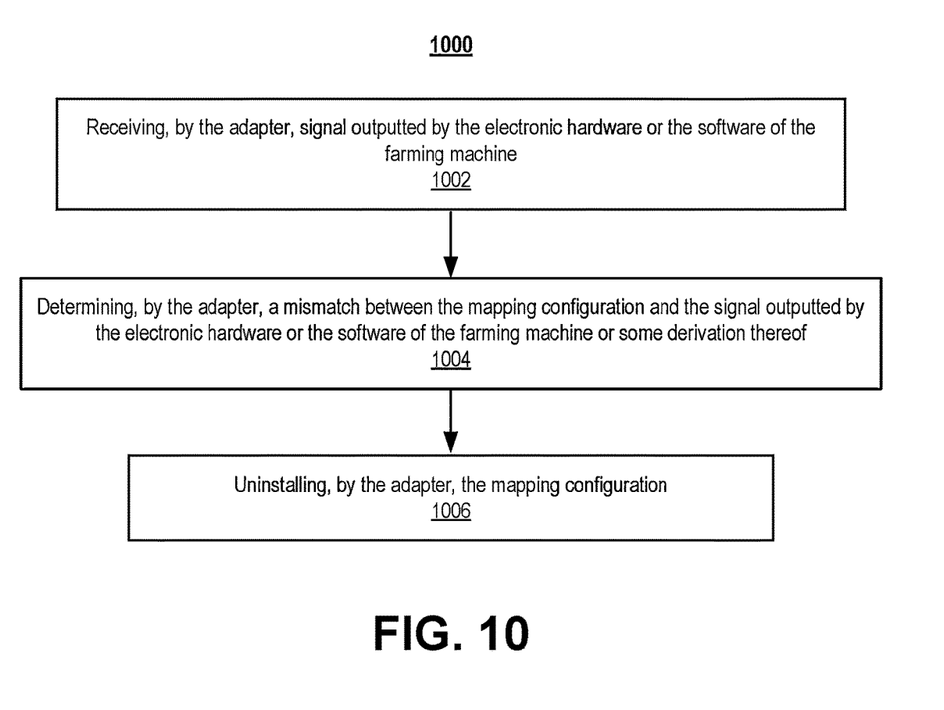

Method 1000 starts with step 1002, which includes receiving, by the adapter, signal outputted by the electronic hardware or the software of the farming machine. At step 1004, the method continues with determining, by the adapter, a mismatch between the mapping configuration and the signal outputted by the electronic hardware or the software of the farming machine or some derivation thereof. Finally, at step 1006, the method continues with uninstalling, by the adapter, the mapping configuration.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a predetermined result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like. It should be borne in mind, however, that these and similar terms are to be associated with the appropriate physical quantities and are merely convenient labels applied to these quantities. The present disclosure can refer to the action and processes of a computing system, or similar electronic computing device, which manipulates and transforms data represented as physical (electronic) quantities within the computing system's registers and memories into other data similarly represented as physical quantities within the computing system memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. Such a computer program can be stored in a computer readable storage medium, such as any type of disk including floppy disks, optical disks, CD-ROMs, and magnetic-optical disks, read-only memories (ROMs), random access memories (RAMs), EPROMS, EEPROMs, magnetic or optical cards, or any type of media suitable for storing electronic instructions, each coupled to a computing system bus.

The algorithms and displays presented herein are not inherently related to any particular computer or other apparatus. Various general-purpose systems can be used with programs in accordance with the teachings herein, or it can prove convenient to construct a more specialized apparatus to perform the methods. The structure for a variety of these systems will appear as set forth in the description herein. In addition, the present disclosure is not described with reference to any particular programming language. It will be appreciated that a variety of programming languages can be used to implement the teachings of the disclosure as described herein.

The present disclosure can be provided as a computer program product, or software, which can include a machine-readable medium having stored thereon instructions, which can be used to program a computing system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

While the invention has been described in conjunction with the specific embodiments described herein, it is evident that many alternatives, combinations, modifications and variations are apparent to those skilled in the art. Accordingly, the example embodiments of the invention, as set forth herein are intended to be illustrative only, and not in a limiting sense. Various changes can be made without departing from the spirit and scope of the invention.

What is claimed is:
1. A system, comprising:
a remote computing system; and
an adapter, configured to:
communicatively couple to electronic hardware and software of a farming machine;
send a machine identification of the electronic hardware or the software to the remote computing system, in response to communicatively coupling to the electronic hardware and software;
receive, from the remote computing system, a provisioning configuration associated with the electronic hardware or the software;
convert source data, outputted by the electronic hardware or the software of the farming machine, into structured data according to the provisioning configuration; and
send the structured data to the remote computing system, wherein the structured data is configured to be a compatible input for mapping processes that are based on a mapping configuration and hosted by the remote computing system.

2. The system of claim 1, wherein the remote computing system is configured to determine or select the mapping configuration, which is associated with the electronic hardware or the software of the farming machine, according to the machine identification.

3. The system of claim 2, wherein the mapping configuration is configured to provide the provisioning configuration.

4. The system of claim 3, wherein the mapping configuration is configured to generate the provisioning configuration.

5. The system of claim 1, wherein the remote computing system is configured to determine or select the provisioning configuration, which is associated with the electronic hardware or the software of the farming machine, according to the machine identification.

6. The system of claim 1, wherein the mapping configuration comprises control logic configured to control communications, sent and received via the adapter, between remote computing systems and the electronic hardware or the software of the farming machine.

7. The system of claim 6, wherein the mapping configuration comprises polling logic configured to:
poll for signal activity inbound to the electronic hardware or the software of the farming machine; and
poll for signal activity outbound from the electronic hardware or the software of the farming machine.

8. The system of claim 1, wherein the mapping configuration comprises conversion logic configured to:
convert outbound signals of the electronic hardware or the software of the farming machine into farming event data; and
format the farming event data for audio or visual presentation by a user interface.

9. The system of claim 8, wherein the conversion logic is configured to associate the farming event data with the provisioning configuration.

10. The system of claim 1, wherein the remote computing system is a cloud computing system.

11. The system of claim 1,
wherein the provisioning configuration is configured to convert the source data into the structured data so that the structured data is transmittable via a computer network that is configured to communicate the structured data but not necessarily configured to communicate the source data, and
wherein the provisioning configuration is configured to perform a provisioning process that adjusts the adapter to be compatible with the electronic hardware or the software of the farming machine.

12. The system of claim 11, wherein the adapter is configured to:
install the provisioning configuration to be used by the adapter, in response to receiving the provisioning configuration sent from the remote computing system; and
convert the source data, outputted by the electronic hardware or the software of the farming machine, into the structured data according to the installed provisioning configuration.

13. The system of claim 12, wherein the adapter is configured to uninstall the provisioning configuration, either:
in response receiving a mismatch signal representing a mismatch between the provisioning configuration and a signal outputted by the electronic hardware or the software of the farming machine, or
in response to determining a mismatch between the provisioning configuration and the signal outputted by the electronic hardware or the software of the farming machine.

14. The system of claim 13, wherein the adapter is configured to:
install the mapping configuration to be used by the adapter, in response to receiving the mapping configuration sent from the remote computing system; and
further convert the source data or convert the structured data into enhanced structured data according to the installed mapping configuration.

15. The system of claim 14, wherein the adapter is configured to uninstall the mapping configuration, either:
in response receiving a mismatch signal representing a mismatch between the mapping configuration and the signal outputted by the electronic hardware or the software of the farming machine or some derivation thereof, or
in response to determining a mismatch between the mapping configuration and the signal outputted by the electronic hardware or the software of the farming machine or some derivation thereof.

16. The system of claim 1,
wherein the machine identification is based on or includes a hardware pin or an onboard software configuration of the farming machine, and
wherein the adapter is configured to generate the machine identification based on the hardware pin or the onboard software configuration of the farming machine.

17. The system of claim 1,
wherein the remote computing system comprises a network communication broker independent of or in combination with the mapping configuration, and
wherein the adapter and the remote computing system communicate using a half-duplex protocol.

18. The system of claim 1,
wherein the remote computing system comprises a network communication broker independent of or in combination with the mapping configuration, and
wherein the adapter and the remote computing system communicate using a publisher-subscriber network protocol.

19. A method, comprising:
communicatively coupling, by an adapter, to electronic hardware and software of a farming machine;
sending, by the adapter, a machine identification of the electronic hardware or the software to a remote computing system, in response to communicatively coupling to the electronic hardware and software to the adapter;
receiving by the adapter, from the remote computing system, a provisioning configuration associated with the electronic hardware or the software;
converting, by the adapter, source data, outputted by the electronic hardware or the software of the farming machine, into structured data according to the provisioning configuration; and
sending, by the adapter, the structured data to the remote computing system,
wherein the structured data is configured to be a compatible input for mapping processes that are based on a mapping configuration and hosted by the remote computing system.

20. A system, comprising a computing device, comprising a processor and a non-transitory computer-readable storage medium for tangibly storing thereon computer program code for execution by the processor, the computer program code comprising:
- executable logic executable to communicatively couple an adapter to electronic hardware and software of a farming machine;
- executable logic executable to send, by the adapter, a machine identification of the electronic hardware or the software to a remote computing system, in response to communicatively coupling to the electronic hardware and software to the adapter;
- executable logic executable to receive by the adapter, from the remote computing system, a provisioning configuration associated with the electronic hardware or the software;
- executable logic executable to convert, by the adapter, source data, outputted by the electronic hardware or the software of the farming machine, into structured data according to the provisioning configuration; and
- executable logic executable to send, by the adapter, the structured data to the remote computing system,
- wherein the structured data is configured to be a compatible input for mapping processes that are based on a mapping configuration and hosted by the remote computing system.

* * * * *